United States Patent [19]
Oliver

[11] 3,947,738
[45] Mar. 30, 1976

[54] PULSED POWER SUPPLY

[75] Inventor: Theodore A. Oliver, Ann Arbor, Mich.

[73] Assignee: Reliance Electric Company, Euclid, Ohio

[22] Filed: Sept. 30, 1974

[21] Appl. No.: 510,498

[52] U.S. Cl. ............... 318/341; 318/345; 318/356; 318/599
[51] Int. Cl.² .......................................... H02P 7/28
[58] Field of Search ........... 318/154, 341, 345, 356, 318/599, 332

[56] References Cited
UNITED STATES PATENTS

| | | | |
|---|---|---|---|
| 3,233,161 | 2/1966 | Sikorra | 318/341 X |
| 3,260,912 | 7/1966 | Gregory | 318/599 X |
| 3,530,353 | 9/1970 | Thompson | 318/341 |
| 3,593,077 | 7/1971 | Loshbough | 318/341 X |
| 3,783,360 | 1/1974 | Bundy | 318/341 X |

Primary Examiner—Gene Z. Rubinson
Attorney, Agent, or Firm—David H. Wilson

[57] ABSTRACT

A reversible control circuit for applying voltage pulses of opposite polarities to a load whereby the average current flowing in the load is a function of the maximum voltage at which the voltage pulses are applied and the duty cycle of the control circuit. The circuit may be utilized to control an electric motor field wherein the motor shunt field winding is connected across a four switch bridge circuit supplied from a direct current or rectified alternating current power source. Current flow in the field winding through a first pair of switches on opposite sides of the bridge can be reversed by opening the first pair of switches and closing the second pair of switches. If the switch pairs are alternately closed and opened in a rapid cyclic manner, the direction and magnitude of the current flow in the field winding can be controlled by varying the duty cycles of the switch pairs.

32 Claims, 11 Drawing Figures

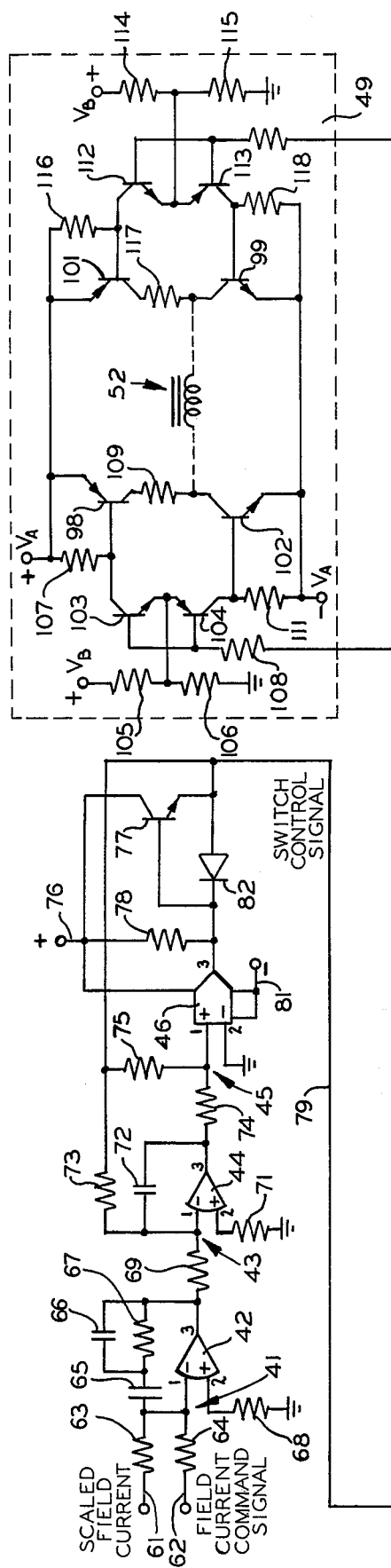
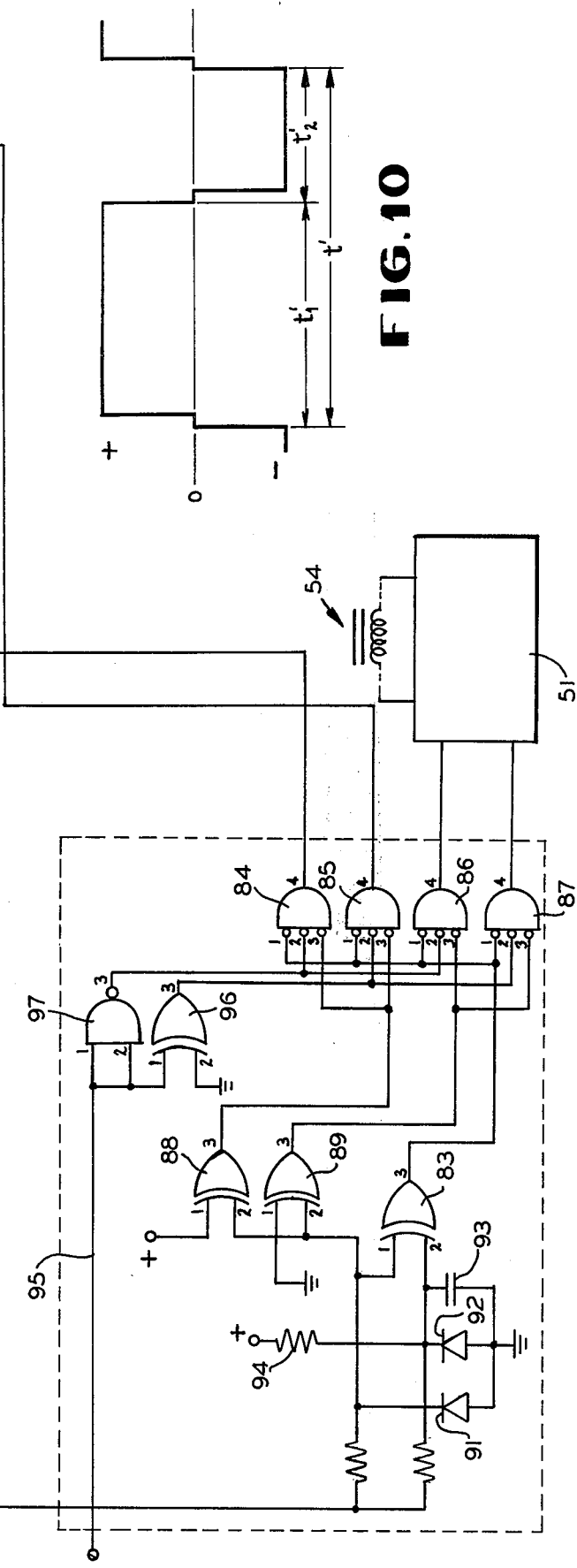
FIG. 10
FIG. 8

PULSED POWER SUPPLY

BACKGROUND OF THE INVENTION

1. Field of the Invention

This invention relates to control circuits for supplying current to a load in general and more particularly to a reversible control circuit for a shunt field winding of a direct current electric motor.

2. Description of the Prior Art

Several systems for controlling the speed of a direct current electric motor have been disclosed in the prior art. Probably the most simple method of speed control is the use of an adjustable resistor in series with the armature circuit. The resistance is increased for starting or for short-time or intermittent slowdowns in its most common usage, but this control has the disadvantage of power loss in the resistor which decreases the system efficiency. A second type of speed control involves a constant armature voltage and a variable voltage applied to the field or an adjustable resistor in series with the field to achieve control over a speed range of approximately four or five to one. The maximum torque is limited by the permissible armature current and the maximum flux which, in turn, is limited by magnetic saturation or by heating of the field winding. This type of control has the disadvantage of slow response when the field current polarity is reversed to change the direction of rotation since larger horsepower motors generally have relatively large field time constants.

Another form of motor speed control involves the use of constant armature current and a variable field excitation. In addition to the disadvantage of the slow response time of the field, this type of control is less common than other controls since constant voltage sources are more readily available than constant current sources. Still another form of speed control is the constant field current and controlled armature voltage type. The armature may be supplied from a controlled rectifier voltage supply or a separately excited direct current generator which is commonly known as a Ward Leonard system. In another form of speed control, both the armature and the field supply voltages may be varied to control speed in response to a control circuit which defines a relationship between these two voltages as a function of the speed error signal.

In any of the types of speed control devices described above wherein the field is controlled, it is desirable to provide as efficient and as economical a control device as possible. Generally, where controlled rectifiers are utilized, the current flow is controlled by blocking a portion of each alternating current voltage cycle and rectifying the portion of the voltage cycle passed to provide an average direct current to the field winding. Therefore, more expensive circuit components having higher peak current ratings must be utilized than in a circuit where the polarity of a direct voltage is alternately reversed to provide the same average current at a lower input voltage level.

U.S. Pat. No. 3,421,065 issued to Lucio Stabile and entitled "Apparatus For Controlling The Speed Of Direct Current Electric Motors" discloses a motor control which provides a variable voltage to the armature and reverses the polarity of the field current in response to a speed error signal. The field is supplied with a relatively constant voltage of one polarity when the speed of the motor is equal to or less than a reference speed and the polarity is reversed to slow the motor if the speed of the motor becomes greater than the reference speed. However, this system has the disadvantage that the field current polarity reversal is only utilized for decreasing the motor speed while a more expensive armature controller is utlized to maintain the desired speed.

U.S. Pat. No. 3,593,077 issued to Richard C. Loshbough and entitled "Electrical Circuit For Pulse Fed Inductive Load" discloses a circuit for applying current pulses of opposite polarity to a shunt generator field in a Ward Leonard speed control system. This circuit applies portions of an alternating current wave form as current pulses of opposed polarity and controllable magnitude for each polarity to a capacitor across the field winding to obtain a net current. However, this control provides only a portion of each input voltage cycle to the capacitor so that there are discontinuities between the pulses and the capacitance must be large enough to store electrical energy to supply current to the field during those discontinuities. Furthermore, the magnitude of each current pulse in this type of control must e greater than the magnitude of more closely spaced current pulse of the same duration to achieve the same net current flow.

SUMMARY OF THE INVENTION

The present invention concerns a reversible control circuit for supplying an average current to a load through the application of voltage pulses of opposite polarities. The control circuit is particularly suited for utilization with the shunt field winding of a direct current electric motor for controlling the motor speed and the direction of rotation. As applied to the hoist motor of an elevator system, the motor armature may be supplied from a suitable power supply while the present invention supplies a variable voltage to the shunt field winding.

In its preferred embodiment, the control circuit includes a four switch bridge circuit supplied from a unidirectional voltage power supply. The shunt field winding is connected across the bridge outputs and current flows in the winding through a first pair of normally open switches on opposite sides of the bridge. This current flow can be reversed to change the direction of rotation of the motor by opening the first pair of switches and closing a second pair of normally open switches. If the switch pairs are alternately closed and opened in a rapid cyclic manner, the field will respond to an average current flow the direction and magnitude of which can be controlled by varyinig the duty cycles of the switch pairs. Since the input current is continuously passed to the field winding, without blocking a portion of it, the switching elements can be of smaller current capabilities and less expensive than the conventional variable voltage field controller because they are not required to switch the higher magnitude current pulses generated in a system having discontinuities between the current pulses for the same average field current.

It is an object of the present invention to provide an improved current controller for supplying an average current to a load.

It is another object of the present invention to provide an improved control circuit for the field current supplied to the shunt field winding of a direct current electric motor.

It is a further object of the present invention to provide a more efficient and more economical motor field current controller whereby a lower supply current is utilized to generate an average current which permits the use of circuit components having smaller peak current capabilities.

It is another object of the present invention to utilize field forcing to effectively decrease the field time constant of an electric motor.

It is still another object of the present invention to generate voltage pulses of opposite polarities whereby the magnitudes and duty cycles of the voltage pulses determine the direction and magnitude of the current flowing in a motor field winding.

BRIEF DESCRIPTION OF THE DRAWINGS

FIGS. 5, 6 and 7 are waveforms generated by the present invention as it responds to a change in the demand for output current;

FIG. 8 is a schematic diagram of the logic and switching controls according to the present invention as shown in block form in FIG. 4;

FIG. 10 is the ideal voltage waveform in the field winding as developed in the circuit of the illustrated embodiment of FIG. 8 of the present invention if the impedance of the winding were purely resistive.

DESCRIPTION OF THE PREFERRED EMBODIMENT

Figure 1:
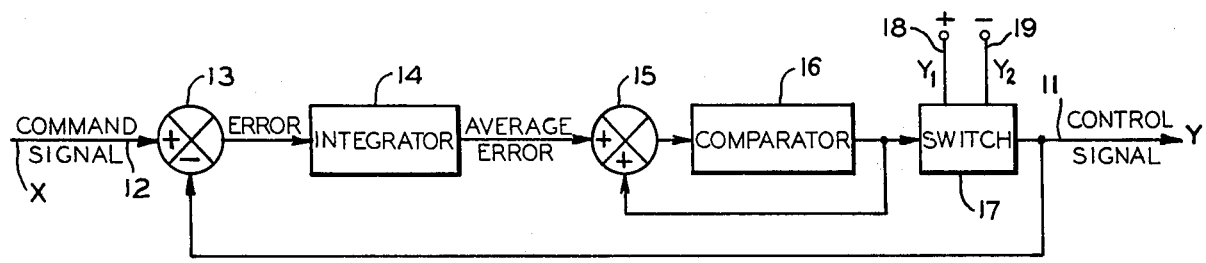
FIG. 1 is a functional block diagram of the present invention.

Referring to FIG. 1, there is shown a functional block diagram of the present invention which generates a control signal Y on an output line 11 in response to a command signal X on an input line 12. The command and control signals are of opposite polarities so that the control signal Y is subtracted from the command signal X at a summing point 13 to produce an error signal to an integrator 14. If the command and control signals are of equal magnitude the error signal will be zero and the control signal will be maintained at that average polarity and magnitude. If the command and control signals are not equal in magnitude, then the error signal will be of the correct polarity for changing the control signal until the error signal once again is zero.

The integrator 14 generates an average error signal which is combined with a feedback signal at a summing point 15 to produce an input signal to a comparator 16. The output from the comparator 16 is the feedback to the summing point 15 and also controls the switch 17 to connect alternately a pair of switch input signals $Y_1$ and $Y_2$, on a pair of input lines 18 and 19 respectively, to the output line 11 to produce the control signal Y.

Figure 2:
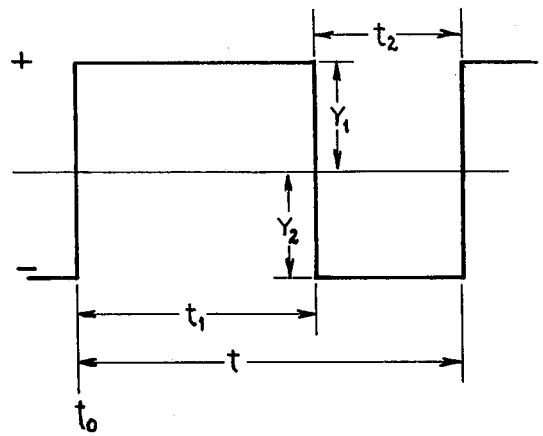
FIG. 2 is an ideal waveform representing the control signal output from the circuit of FIG. 1.

If the switch input signals $Y_1$ and $Y_2$ are voltages of opposite polarities, the control signal Y may be represented by the waveform shown in FIG. 2. Over a single cycle having a time interval $t$, the average value of the control signal $\overline{Y}$ will be equal to $(Y_1 t_1 - Y_2 t_2)/t$ where $t_1$ and $t_2$ are the durations of the switch input signals. Therefore, the average value of the control signal on the output line 11 will have a magnitude which is a function of the magnitude of the switch input signals $Y_1$ and $Y_2$ and their durations $t_1$ and $t_2$.

If $\Delta Q$ represents the change in electrical charge over a change in time of one cycle $\Delta t$ and the integrator 14 is driven toward a zero average current signal by the error signal input, then the change in charge $\Delta Q_1$ during the time $t_1$ must be equal the change in charge $\Delta Q_2$ during the time $t_2$. The current i required to produce the change in charge can be represented as a derivative so that $$i = dQ/dt = \lim_{\Delta t \to 0} \Delta Q/\Delta t \text{ and } Q = \int_t i \, dt.$$

If the $Y_1$ and $Y_2$ switch input signals are voltage pulses and X is a voltage command signal, then the average value of the voltage command signal $\overline{X}$ may be written in terms of the average value of the voltage control signal $\overline{Y}$. Since $\Delta Q_1$ equals the change in charge $q_1$ due to the switch input signal $Y_1$ during the time interval $t_1$ minus the change in charge $q_2$ due to the command signal X during the time interval $t_1$ and $\Delta Q_2$ equals the change in charge $q_3$ due to the switch input signal $Y_2$ during the time interval $t_2$ minus the change in charge $q_4$ due to the command signal X during the time interval $t_2$, $$q_1 - q_2 = \Delta Q_1 = \Delta Q_2 = q_3 - q_4$$

and $$\int_{t_1}(Y_1 - X)dt = \Delta Q_1 = - \int_{t_2}(-Y_2 - X)dt.$$

Therefore, $$\int_{t_1} Y_1 \, dt = \Delta Q_1 + \int_{t_1} X \, dt$$

and $$\int_{t_2} Y_2 \, dt = \Delta Q_1 - \int_{t_2} X \, dt$$

so that $$\overline{Y} = (\int_{t_1} Y_1 \, dt - \int_{t_2} Y_2 \, dt)/t = (\Delta Q_1 = \int_{t_1} X \, dt - \Delta Q_2 + \int_{t_2} X \, dt)/t = \int_t X dt/t = \overline{X}$$

and the average voltage command signal $\overline{X}$ will be equal to the average voltage control signal $\overline{Y}$. Thus, to this point in the discussion, the present invention may be utilized to provide an average voltage to a load in response to a voltage command signal and will respond to changes in the voltage across the load or the command signal to stabilize at zero error between the command signal and the average voltage.

Figure 3:
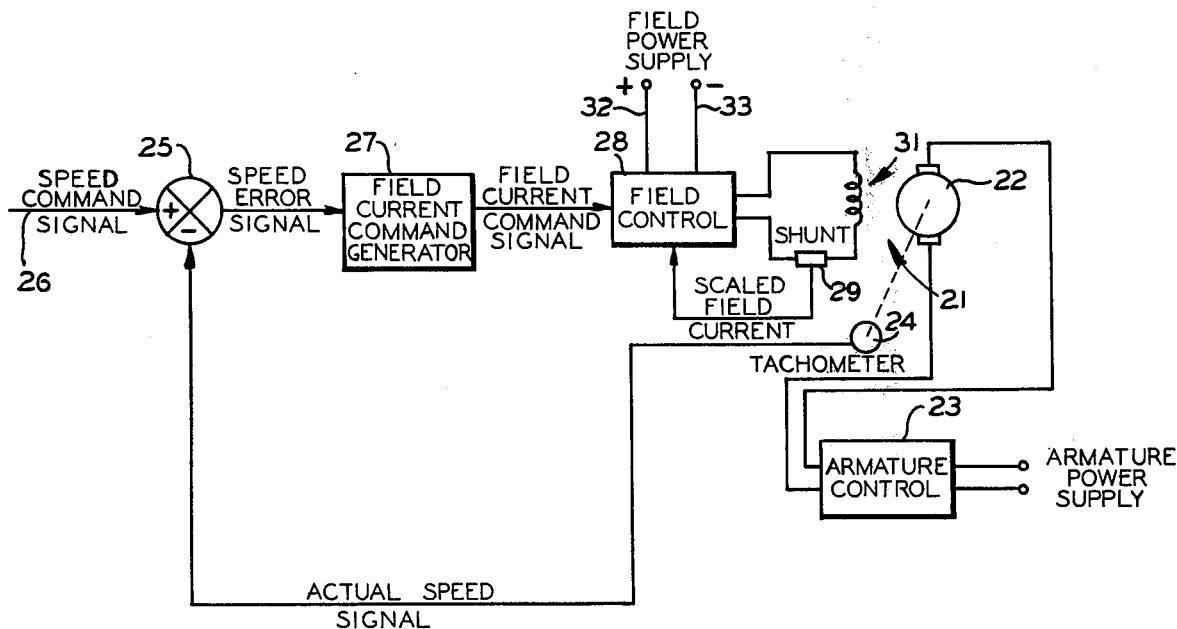
FIG. 3 is a functional block diagram of a motor speed control system including the present invention.

Referring to FIG. 3, there is shown a functional block diagram of a motor speed control system including the present invention. A shunt field direct current motor 21 has an armature 22 supplied with current from a suitable armature control 23. The armature control 23 converts alternating circuit from an armature power supply (not shown) to direct current in the motor armature. The motor speed is measured by a tachometer 24 connected to the motor output shaft. The tachometer 24 generates an actual speed signal which is subtracted from a speed command signal at a summing point 25 to produce a speed error signal. The speed command signal on an input line 26 may be generated by any of a number of well-known signal pattern generators (not shown). A field current command generator circuit 27 generates a field current command signal in response to the speed error signal and this field current command signal is the input to a field control circuit 28 according to the present invention.

The field control circuit 28 is responsive to the field current command signal and the field current as sensed with a current shunt 29 inserted in series with a shunt field winding 31 of the motor 21 to supply a field current similar to the waveform shown in FIG. 2. The shunt 29 generates a scaled field current signal which is proportional to the actual field current and comparable in magnitude to the field current command signal. A positive voltage input 32 and a negative voltage input 33 from a field power supply (not shown) are alternately connected to the shunt field winding 31 to produce the $Y_1$ and $Y_2$ voltage pulses. The direction of rotation of the motor 21 is controlled by the direction of flow of the current in the shunt field winding 31 and the motor speed is controlled by the magnitude of the current flow. Both the magnitude and the direction of the current flow are functions of the magnitudes and durations of the voltage pulses since $\overline{Y} = (Y_1 t_1 - Y_2 t_2)/t$.

Figure 4:
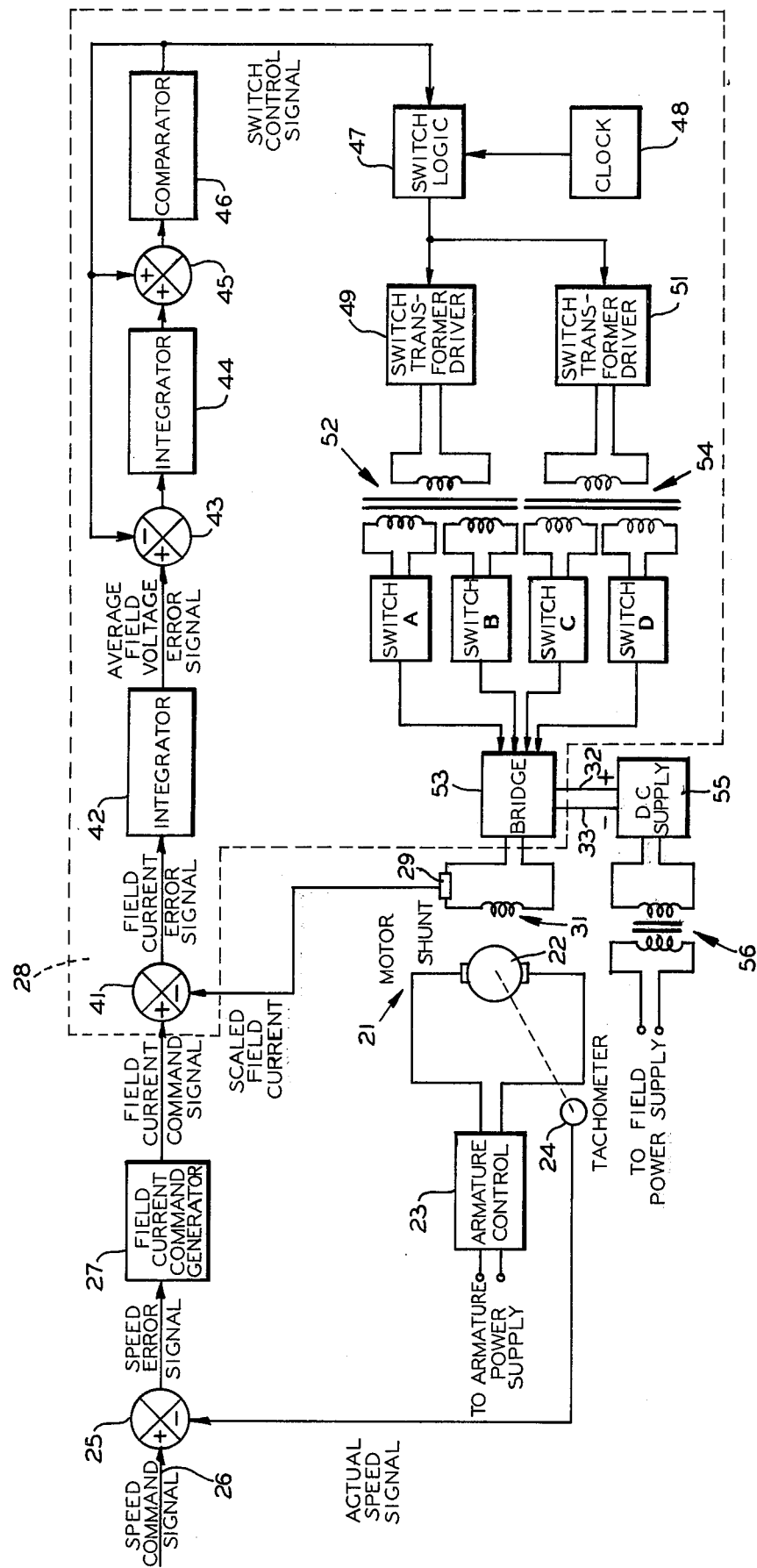
FIG. 4 is a more detailed block diagram of the motor speed control system of FIG. 3.

Referring to FIG. 4, there is shown a more detailed functional block diagram of the motor speed control system of FIG. 3. The shunt field direct current motor 21 has the armature 22 supplied with current from a suitable armature control 23 which in turn is connected to a power supply (not shown). The motor speed is detected by the tachometer 24 and is subtracted from the speed command signal on the input line 26 at the summing point 25 to produce a speed error signal. The speed error signal generates a field current command signal from the field command generator 27. The field current command signal and the scaled field current signal from the current shunt 29 are the inputs to the field control circuit 28 which supplies current to the shunt field winding 31 of the motor 21. The field control circuit 28 is supplied with positive and negative voltage on the input lines 32 and 33 respectively from a field power supply (not shown).

The field control circuit 28 supplies a current waveform to the shunt field winding 31 having an average value proportional to the field current command signal provided by the field command generator 27. The scaled field current is subtracted from the field current command signal at a summing point 41 to provide a field current error signal. The field current error signal is inverted and integrated by an integrator 42 to provide an average field voltage error signal at a summing point 43. The switch control signal is subtracted from the average error signal to produce an input signal to an integrator 44. The switch control signal has a waveform similar to the waveform shown in FIG. 2 and therefore, the integrator 44 will generate a sawtooth waveform (skewed by the average error signal and switch control signal) which is added to the switch control signal at a summing point 45 to generate an input signal to a comparator 46. The switch control signal displaces alternate portions of sawtooth waveform above and below a zero reference and the positive and negative input signals produce a duty cycled square wavefrom from the comparator 46.

Referring to FIGS. 5, 6, and 7, there are shown the waveforms associated with the present invention. The waveforms of FIG. 5 are generated when the field current command signal of FIG. 5A and the scaled field current of FIG. 5B are both equal to zero to produce a zero field voltage error signal as shown in FIG. 5C. In order to provide a zero field current, the output of the comparator 46 must be comprised of equal intervals for the positive and negative polarity portions of the switch control signal of FIG. 5D so that $t_1 = t_2$ and the net current flow through the field windings will be zero if the magnitudes $Y_1$ and $Y_2$ of the voltage pulses are equal. The integrator 44 will generate a sawtooth waveform about the zero field voltage error signal as shown in FIG. 5E. The sawtooth waveform is displaced from the zero field voltage error signal reference point by the addition of the switch control signal to produce an input signal for the comparator 46 as shown in FIG. 5F. The positive polarity comparator input signals during the $t_1$ time intervals will generate the positive polarity portions of the switch control signal waveform of FIG. 5D and the negative polarity comparator input signals during the $t_2$ time intervals will generate the negative polarity portions of the switch control signal.

If a field current command signal is applied as shown in FIG. 6A, it will be added to the zero scaled field current signal of FIG. 6B and inverted to produce the field voltage error signal of FIG. 6C. The field voltage error signal is summed with the switch control signal of FIG. 6D and the combined signal is inverted and integrated to generate a sawtooth waveform which is skewed by the magnitude of the field voltage error signal as shown in FIG. 6E. The integrator output is summed with the switch control signal to displace the alternate portions of the switch control signal. However, the field voltage error signal has skewed the sawtooth waveform so that the zero reference crossing points have been shifted toward the transition point from the $t_1$ to the $t_2$ time intervals. Therefore, the comparator 46 will be switched from a negative polarity output to a positive polarity output earlier in the cycle to shorten the time interval $t_2$ and lengthen the time interval $t_1$ as shown in FIG. 7D to provide a net current flow through the field winding which will tend to force the field voltage error signal to zero.

When the scaled field current is equal to the field current command signal, the field voltage error signal will be constant as shown in FIGS. 7A, 7B and 7C. The switch control signal will be similar to the current pulses in the field winding so that a net current flows where $t_1 > t_2$ as shown in FIG. 7D. The integrator output will produce a sawtooth waveform from the switch control signal as shown in FIG. 7E and the sawtooth will be displaced by the switch control signal to produce the comparator input signal of FIG. 7F. The comparator responds to the comparator input signal by generating the switch control signal of FIG. 7D to maintain the net current in the field winding. Any change in the field current command signal will cause the sawtooth to be modified to generate the proper square wave switch control signal which changes the field current and forces the field voltage error signal to zero.

The switch control signal is an input to a switch logic circuit 47. The logic circuit 47 responds to the switch control signal and a pulse train from a clock 48 to generate switching pulses to a pair of switch transformer drivers 49 and 51. The frequency of the clock pulse train is relatively high as compared with the frequency of the square wave switch control signal so that during the $t_1$ and $t_2$ time intervals, a plurality of switching pulses are generated by the drivers 49 and 51. Switch transformer driver 49 controls current flow in the field winding 31 for a first direction of motor rotation and switch transformer 51 controls current flow for the opposite direction of motor rotation. If the drivers are responsive to the waveform shown in FIG. 7D as modified by the switch logic circuit 47, the plurality of pulses during the time interval $t_1$ will generate a corresponding plurality of pulses through a transformer 52 to a pair of normally open switches, switch A and switch B, to connect the field winding 31 to the positive voltage input line 32 through a bridge 53. Then the plurality of pulses during the time interval $t_2$ will generate a corresponding plurality of pulses through a transformer 54 to a pair of normally open switches, switch C and switch D, to connect the field winding 31 to the negative voltage input line 33 through the bridge 53. The bridge 53 is supplied with electrical power from a unipolar voltage power supply 55 connected to an alternating current field power supply (not shown) through a transformer 56.

In summary, the present invention, as applied to a direct current shunt field motor, supplies field current having an average value which is a function of the magnitude and duration of voltage pulses of opposite polarities. The actual speed of the motor 21 is subtracted from a speed command signal to obtain a speed error signal. The field command generator 27 is responsive to the speed error signal to generate a field current command signal from which is subtracted the scaled field current to obtain a field current error signal. The field current error signal is integrated and summed with a switch control signal and is integrated by the integrator 44 to produce a sawtooth waveform. The sawtooth waveform is summed with the switch control signal at an input to the comparator 46 which generates the switch control signal as a duty cycled square wave. A change in the speed command signal or the actual speed signal will produce an average field voltage error signal to skew the sawtooth and change the crossing points of the waveform to vary the $t_1$ and $t_2$ time intervals and change the average field voltage to drive the current error to zero. The square wave switch control signal is modified by the switch logic circuit 47 and clock 48 to apply a plurality of switching pulses to the switch transformer drivers 49 and 51 and the transformers 52 and 54. The normally open switches A, B, C and D respond to the plurality of switch pulses to connect the positive and negative unipolar voltage input lines 32 and 33 alternately to the field winding 31 through the bridge 53 to supply an average current flow.

Referring to FIG. 8, there is shown a schematic diagram of the logic and switching controls of FIG. 4. The scaled field current and field current command signal are inputs on a pair of lines 61 and 62 to the summing point 41. The polarity of the command signal is the opposite of the polarity of the field current signal for the same direction of motor rotation so that the command signal is subtracted to generate a field current error signal at the inverting input 42-1 of the integrator 42. The scaled field current and field current command signals are connected to the summing point 41 through a pair of resistors 63 and 64. The integrator 42 comprises an operational amplifier having an inverting input 42-1, a non-inverting input 42-2 and an output 42-3 and a capacitor feedback circuit including a pair of capacitors 65 and 66 in series between the input 42-1 and the output 42-3 and a resistor 67 in parallel with the capacitor 66. With the non-inverting input 42-2 connected to ground through a resistor 68, the integrator 42 will invert the field current error signal and generate an average field voltage error signal to the summing point 43 through a resistor 69.

The integrator 44 also comprises an operational amplifier having a non-inverting input 44-2 connected to ground through a resistor 71 and an inverting input 44-1 connected to an output 44-3 through a capacitor 72. The summing point 43 receives the switch control signal through a resistor 73. The square wave switch control signal generates a sawtooth wavefrom from the integrator 44 wherein the sawtooth is symetrical about a zero reference level. This sawtooth waveform is then applied to the summing point 45 through a resistor 74. The switch control signal is also applied to the summing point 45 through a resistor 75 to displace the positive and negative-going portions of the sawtooth as shown in FIGS. 5F, 6F, and 7F. The displaced sawtooth waveform is applied to a non-inverting input 46-1 of the comparator 46 which responds to the polarity of the voltage applied between the input 46-1 and an inverting input 46-2. The positive voltage on the input 46-1 during the positive-going portion of the displaced sawtooth will turn off the comparator output 46-3 so that a positive voltage from a positive power supply (not shown) on a line 76 is applied to the base of a NPN transistor 77 through a resistor 78. The positive voltage will turn on the transistor 77 to connect the positive voltage on the line 76 to a switch control signal line 79 to generate the positive polarity portion of the switch control signal during the time interval $t_1$. The negative polarity portion of the displaced sawtooth waveform will turn on the comparator 46 to connect a negative voltage from a negative voltage source on a line 81 to the output 46-3. The negative voltage will turn off the transistor 77 but will be passed by a diode 82 to the line 79 to generate the negative polarity portion of the switch control signal during the time interval $t_2$.

The square wave switch control signal on the line 79 is applied to the inputs of an exclusive-OR gate 83 through a pair of resistors. In describing the circuit logic elements, a positive voltage or true logic signal will be represented as a "1" and a zero or negative voltage or false logic signal will be represented as a "0". If both of the inputs to the exclusive-OR gate 83 receive the same logic signal, a 0 output signal will be generated at an output 83-3. If the inputs receive different logic signals, a 1 output signal will be generated. During the time interval $t_1$, both inputs 83-1 and 83-2 will be at 1 to generate a 0 at output 83-3 to an input on each of four negative logic NOR gates 84, 85, 86 and 87. Each of the NOR gates will generate a 0 if any input is at 1 and will generate a 1 if all inputs are at 0. Therefore, each of the NOR gates is enabled by the 0 from the exclusive-OR gate 83. The 1 is also present at a pair of inputs 88-2 and 89-2 of a pair of exclusive-OR gates 88 and 89 respectively. The exclusive-OR gate 88 has an input 88-1 connected to a positive power supply to place a 1 at the input 88-1 and generate a 0 at the output 88-3 to enable the NOR gates 84 and 85.

The exclusive-OR gate 89 has an input 89-1 connected to ground to place a 0 at the input 89-1 and generate a 1 at the output 89-3 to disable the NOR gates 86 and 87 which generate a 1 at the outputs 86-4 and 87-4. During the time interval $t_2$, the negative polarity portion of the switch control signal will cause a current flow from ground through a pair of diodes 91 and 92 to effectively place a 0 at the inputs 83-1 and 83-2 of the exclusive-OR 83 which generates a 0 to enable the NOR gates 84 through 87. The 0 at the input 88-2 will generate a 1 from the output 88-3 to the inputs 84-3 and 85-3 to disable the NOR gates 84 and 85 which generate a 0. The "0" at the input 89-2 will enable the exclusive- OR 89 to generate a 0 from the output 89-3 to the inputs 86-3 and 87-3 to enable the NOR gates 86 and 87. Therefore, during the time interval $t_1$ the NOR gates 84 and 85 are enabled to generate switch pulses to the switch transformer driver 49 and during the time interval $t_2$ the NOR gates 86 and 87 are enabled to generate switch pulses to the switch transformer driver 51.

When the switch control signal changes from positive to negative polarity during each cycle and from negative to positive polarity between each cycle, the capacitor 93 provides a time delay which disables the NOR gates 84 to 87 for a predetermined time interval to prevent the turning on of all the switches A, B, C and D at the same time to short cut the bridge 53 of FIG. 4. During the time interval $t_1$, the capacitor 93 has charged up to a 1 on the input 83-2 and when the control signal goes negative after $t_1$ to place a 0 on the input 83-1 the capacitor 93 will supply a 1 as it discharges to generate a 1 from the output 83-3 and disable the NOR gates 84 to 87 until the capacitor has discharged to place a 0 on the input 83-2. During the time interval $t_2$, the capacitor 93 has been discharged to place a 0 on the input 83-2 and when the control signal goes positive after $t_2$ to place a 1 on the input 83-1 the capacitor 93 will supply a 0 as it discharges to generate a 1 from the output 83-3 and disable the NOR gates 84 to 87 until the capacitor has charged to place a 1 on the input 83-2. If there is no output from the comparator 46, the input 83-1 will be at 0 and the input 83-2 will receive a 1 from a positive power supply through a resistor 94 to generate a 1 at the output 83-3 and disable the NOR gates 84 to 87.

A train of alternating 0 and 1 pulses is received on an input line 95 from the clock 48 of FIG. 4. An exclusive-OR gate 96 has an input 96-2 connected to ground to supply a 0 to generate a 0 at an output 96-3 when an input 96-1 is at 0 to enable the NOR gates 85 and 87 at a pair of inputs 85-2 and 87-2. When the input 96-1 is at 1, a 1 is generated to disable the NOR gates 85 and 87 which generate a 0. A NAND gate 97 has a pair of inputs 97-1 and 97-2 connected to the input line 95. When there is a 0 at either or both inputs the output is at 1 and when both inputs are at 1 the output is at 0. Therefore, when the line 95 is at 0, the NAND gate 97 produces a 1 to disable the NOR gates 84 and 86 and when the line 95 is at 1, the NAND gate 97 produces a 0 to enable the NOR gates 85 and 87. If the frequency of the clock pulse train on the line 95 is relatively high as compared with the frequency of the switch control signal on the line 79, during the time interval $t_1$ the NOR gates 84 and 85 will generate pulse trains of the same frequency as the clock pulse train with the pulse train from the NOR gate 84 being the same as and the pulse train from the NOR gate 85 being the inversion of the clock pulse train. During the time interval $t_2$, the NOR gate 85 and 87 will generate pulse trains of the same frequency as the clock pulse train with the pulse train from the NOR gate 86 being the same as and the pulse train from the NOR gate 87 being the inversion of the clock pulse train. These pulse trains are the switch pulses to the switch transformer drivers 49 and 51.

The switch transformer driver 49 responds to the switch pulses from the NOR gates 84 and 85 by alternating the current flow through the primary winding of the transformer 52. A 1 from an output 84-4 of the NOR gate 84 will turn on a pair of transistors 98 and 99 to connect the primary winding of the transformer 52 between a positive voltage power supply $+V_A$ and negative voltage power supply $-V_A$ for current flow in a first direction. When the output of the NOR gate 84 changes from 1 to 0, the output of the NOR gate 85 changes from 0 to 1 to turn off the transistors 98 and 99 and turn on a pair of transistors 101 and 102. The transistors 101 and 102 connect the opposite ends of the primary winding of the transformer 52 between the positive voltage $+V_A$ and the negative voltage $-V_A$ for current flow in the opposite direction. Since the pulse trains from the NOR gates 84 and 85 are at a relatively high frequency, a train of pulses of alternating polarity will be generated which are utilized to control the switches A, B, C and D connected to the bridge 53 of FIG. 4.

The output 84-4 of the NOR gate 84 is connected to the bases of a pair of transistors, a NPN transistor 103 and a PNP transistor 104, having their emitters connected together. The emitters are connected to a voltage divider comprising a resistor 105 connected to a positive voltage power supply $+V_B$ and a resistor 106 connected to ground. The collector of the transistor 103 is connected to the base of the transistor 98 and to the positive voltage $+V_A$ through a resistor 107. When the transistor 103 is turned off, the positive voltage $+V_A$ is applied to the base of the transistor 98 through the resistor 107 and directly to the emitter to turn off the PNP transistor 98. When the output 84-4 of the NOR gate 84 is at 1, a voltage is applied to the base of the transistor 103 through a resistor 108 to turn on the transistor 103 and apply the voltage across the resistor 106 to the base of the transistor 98. For example, if the voltage $+V_B$ is approximately positive 14 volts and the resistors 105 and 106 are of equal value, the emitters of the transistors 103 and 104 will be at approximately positive 7 volts. If the voltage $+V_A$ is approximately positive 24 volts and the 1 from the NOR gate 84 is approximately positive 14 volts, the transistor 98 will turn on and apply the voltage $+V_A$ to the one end of the primary winding of the transformer 52 connected to the collector of the transistor 98 through the current limiting resistor 109.

The 1 from the output 84-4 of the NOR gate 84 is also applied to the base of the PNP transistor 104 which has its collector connected to the negative voltage $-V_A$ which may be approximately negative 24 volts. Since the positive 14 volts from the output 84-4 is more positive than the positive 7 volts at the emitter of the PNP transistor 104 the transistor 104 will be turned off. Therefore, the negative voltage $-V_A$ will be applied to the emitter of the NPN transistor 102 through a resistor 111 and to the collector to turn off the transistor 102 so that current must flow from the positive voltage power supply $+V_A$ through the transistor 98 and the primary winding of the transformer 52.

When the output 84-4 of the NOR gate 84 is at 0, the base of the transistor 103 will be at ground to turn off the transistor 103 and apply the positive voltage $+V_A$ to the base of the transistor 98 to turn off the transistor 98. Since the 0 at the base of the transistor 104 is more negative than the positive 7 volts applied to the emitter, the transistor 104 will turn on to apply the positive 7 volts to the base of the transistor 102. The transistor 102 will turn on with the positive 7 volts on its base and the negative 24 volts on its emitter to connect the one end of the primiary winding of the transformer 52 to the negative 24 volts for current flow in the opposite direction.

The other end of the primary winding of the transformer 52 is connected to a similar transistor switching network which is responsive to the pulse train from the NOR gate 85. A pair of transistors, a NPN transistor 112 and a PNP transistor 113, have their emitters connected to a voltage divider comprising a resistor 114 connected to the positive voltage $+V_B$ and a resistor 115 connected to ground. When the output 84-4 of the NOR gate 84 is at 1 to turn on the transistor 98, the output 85-4 of the NOR gate 85 is at 0 to turn on the transistor 113 and the NPN transistor 99 to connect the negative voltage $-V_A$ to the primary winding of the transformer 52. The 0 at the emitter of the transistor 112 turns off the transistor 112 to apply the positive voltage $+V_A$ to the emitter of the transistor 101 through a resistor 116 to turn off the transistor 101.

When the output 84-4 of the NOR gate 84 is at 0 to turn on the transistor 102, the output 85-4 of the NOR gate 85 is at 1 to turn on the transistor 112 and the transistor 101 to connect the positive voltage $+V_A$ to the primary winding of the transistor 52 through a current limiting resistor 117. The 1 at the emitter of the transistor 113 turns off the transistor 113 to apply the positive voltage $+V_A$ to the emitter of the transistor 99 through a resistor 118 to turn of the transistor 99.

Figure 9:
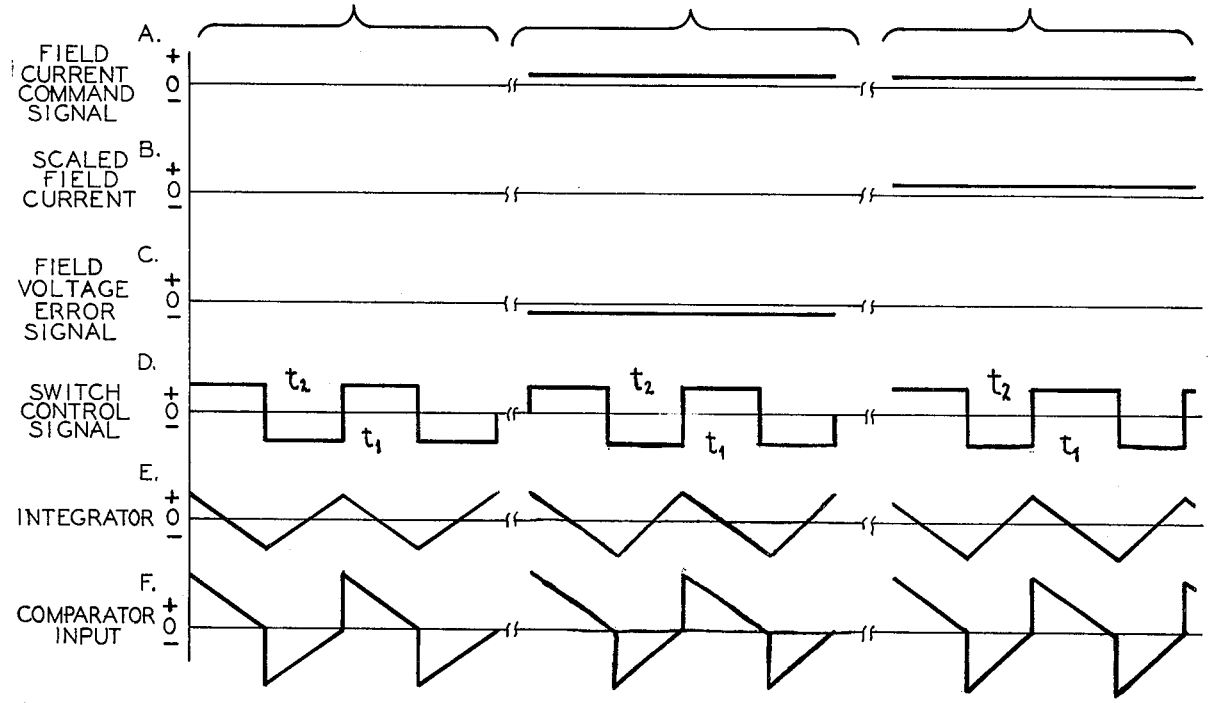
FIG. 9 is a schematic diagram of the direct current power supply, the bridge and the switches connected to the motor field winding according to the present invention as shown in block form in FIG. 4.

Therefore, the primary winding of the transformer 52 will be connected between the positive voltage $+V_A$ and the negative voltage $-V_A$ for a first direction of current flow by the transistors 98 and 99 and for the opposite direction of current flow by the transistors 101 and 102 to generate a train of pulses of alternating polarities to the switches A and B of FIG. 9 during the time interval $t_1$. The switch transformer driver 51 is similar to the switch transformer driver 49 and responds to the pulse trains from the outputs 86-4 and 87-4 of the NOR gates 86 and 87 to generate a train of pulses of alternating polarities in the transformer 54 to the switches C and D of FIG. 9 during the time interval $t_2$.

Referring to FIG. 9, there is shown a schematic diagram of the direct current power supply 55, the bridge 53 and the normally open switches A, B, C and D connected to the motor field winding 31 according to the present invention as shown in block form in FIG. 4. The transformer 56 is connected to an alternating voltage field current power supply (not shown) and supplies alternating current to the direct current power supply 55. The power supply 55 includes a diode bridge having four diodes 121, 122, 123 and 124 which full wave rectify the alternating current and charge a capacitor 125. The capacitor 125 is connected between the positive voltage input line 32 and the negative voltage input line 33 to smooth the rectified alternating current to obtain relatively ripple free direct current which is supplied to the bridge 53.

The full-wave rectifying bridge 53 has four diodes 126, 127, 128 and 129. These diodes provide a path for current back to the supply so that no switch need conduct current in a reverse direction. Each of the diodes 126 to 129 is connected in parallel with one of the switches A, B, C and D respectively. When the transformer 52 is passing pulses to the switches A and B during the time interval $t_1$, the switches A and B will be turned on to apply unipolar voltage from the direct current power supply 55 on the positive voltage input line 32, through the switch B, to the field winding 31 and the current shunt 29, through the switch A and back to the power supply on the negative voltage input line 33. When the transformer 54 is passing pulses to the switches C and D during the time interval $t_2$, the switches C and D will be turned on to apply voltage from the direct current power supply 55 on the positive voltage input line 32, through the switch D, to the current shunt 29 and the field winding 31, through the switch C and back to the power supply 55 on the negative voltage input line 33. If the impedance of the field winding 31 were purely resistive, the field current waveform would appear as shown in FIG. 10 having a cycle duration of $t'$. Each time the waveform changes polarities, the exclusive-OR gate 83 and the capacitor 93 provide a zero current interval so that the one pair of transistor switches is completely turned off before the other pair of transistor switches is turned on to prevent a short circuiting of the bridge 53. However, this zero current interval is small as compared with the time intervals of the positive polarity and negative polarity portions of the waveform so that the time intervals $t_1'$ and $t_2'$ are approximately equal to the time intervals $t_1$ and $t_2$ of FIG. 2.

However, the field winding 31 has a large inductive component which tends to sustain current flow in one direction. Therefore, the current flowing in the field winding 31 represents an average direct current having a magnitude determined by the average voltage applied during the cycle time and the impedance of the winding. There will also be a ripple current determined by the switching frequency of the transistor switches and the time constant of the field winding. The current shunt 29 will generate a voltage representing the field current on a line 131 which is the scaled field current signal to the summing point 41 of FIG. 4.

If the time interval $t_1$ is greater than the time interval $t_2$, the switches A and B will be turned on longer than the switches C and D to generate an average current flow from the junction of the diodes 127 and 128, through the field winding 31 and the current shunt 29, to the junction of the diodes 126 and 129. Since the current in an inductor cannot be changed by a finite amount in zero time, when the switches A, B, C and D are turned off the current will continue to flow in the same direction but the path will include the diodes 128 and 129 so that current is flowing back into the capacitor 125 of the power source 55. When the switches C and D are turned on, the voltage from the power source 55 will be applied to the field winding 31 so as to tend to reduce the average current flow. When the switches A and B are turned on, the voltage from the power source 55 will be applied to tend to increase the average current flow. Therefore, the alternate switching of the switches A, B, C and D will generate a ripple current centered about the average current flowing in the field winding 31. If the time interval $t_2$ is greater than the time interval $t_1$, the switches C and D will be turned on longer than the switches A and B to generate an average current flow from the junction of the diodes 126 and 129, through the current shunt 29 and the field winding 31, to the junction of the diodes 127 and 128. When the switches are turned off, the current will continue to flow in the same direction but the path will include the diodes 126 and 127 so that current is flowing back into the capacitor 125 of the power source 55.

Switch B of FIG. 9 is representative of the switches A, B, C and D and shows the switch circuit for by-passinig the diode 127 of the bridge 53. During the time interval $t_1$ the transformer 52 passes a train of pulses of alternating polarities to the switch B. A "positive" pulse will generate current flow from a secondary winding 132, through a diode 133, through a pair of resistors 134 and 135 and back to the secondary winding 132. A "negative" pulse will generate current flow from a secondary winding 136, through a diode 137 and through the resistors 134 and 135 and back to the secondary winding 136. Therefore, the diodes 133 and 137 function as a rectifier for the pulses from the switch transformer driver 49 to provide a direct current switch signal to the base of a transistor 138. The collector of the transistor 138 is connected to the collector of a transistor 139 and the emitter of the transistor 138 is connected to the base of the transistor 139 to form a Darlington configuration which has the advantage of high current amplification. Therefore, a relatively small base current supplied to the transistor 138 can control a relatively large field current passing through the pair of transistors 138 and 139. Typically, this field current may be of the order of five to ten amperes in an elevator hoist motor employing the present invention. The cathode of a diode 141 is connected to the collectors of the transistors 138 and 139 to prevent reverse current flow through the transistors when they are turned off. Of course, the transistors 138 and 139 can be replaced by a single transistor where high current gain is not required.

Where the field current required is greater than the current carrying capacity of the transistors 138 and 139, the circuit of FIG. 9 may be modified to increase its current capacity. Each of the switches A, B, C and D can be paralleled by a similar switch which receives a train of pulses through the corresponding transformer, 52 or 54, to double the current which may be supplied to shunt field winding 31 as each parallel switch passes one half of the total current.

One disadvantage of field current flow reversing to obtain a reversal of the direction of rotation of a motor is that the field time constant, and therefore the time required to reverse the field, is larger than the armature time constant so that a field reversal control has a longer response time than an armature reversal control. However, the longer field time constant can be overcome by field forcing where two to three times the normal field voltage is applied to cause the field to aim for a much higher current level to decrease the time required to reach the normal operating current level. For example, the voltage $V_C$ across the capacitor 125 of FIG. 9 may be 200 volts so that the average voltage across the field winding 31 $\overline{V}_f = (V_C t_1' - V_C t_2')/t'$. If 60 volts is required to produce a 5 to 10 ampere maximum field current and $t'$ is approximately 1 millisecond, then $t_1' = 0.65$ millisecond and $t_2' = 0.35$ millisecond at maximum field current. If the field current is to be reversed either $t_1'$ or $t_2'$ is increased to apply the full 200 volts in the correct direction to reverse the field current for the full time interval $t'$ until the field current has built up to the level required to force the field current error signal to zero.

Figure 11:
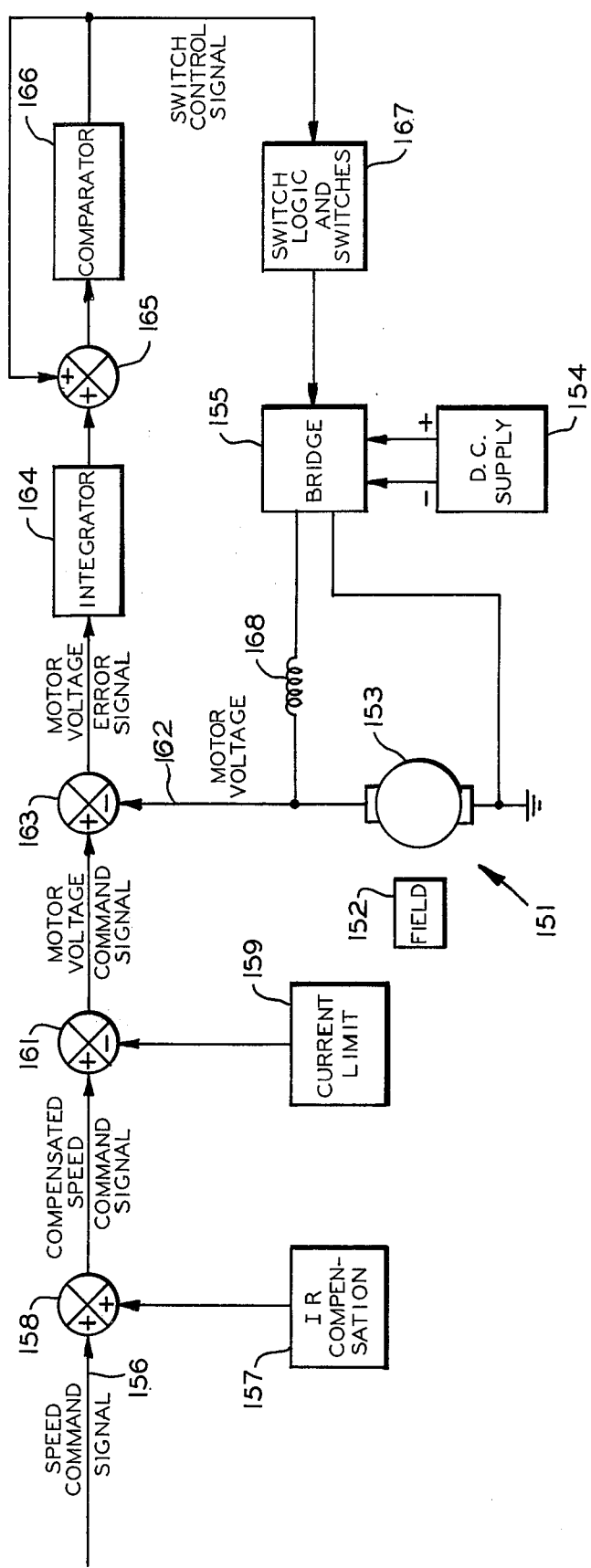
FIG. 11 is a functional block diagram of a motor speed control for a motor armature according to an alternate embodiment of the present invention.

The present invention can also be utilized to provide reversible current to the armature of a direct current motor. For example, in FIG. 9 the field winding 31 could be the armature winding of the motor. Referring to FIG. 11, there is shown a functional block diagram of an alternate embodiment of the present invention for controlling the armature of a direct current motor. A shunt field direct current motor 151 has a field 152 which can be a field winding supplied from a power source (not shown) or a permanent magnet. The motor 151 also has an armature which is supplied with current from a direct current supply 154 through a bridge 155 similar to the bridge 53 of FIGS. 4 and 9.

The speed of the motor 151 is controlled by the application of a speed command signal on an input line 156 which may be generated by any of a number of well-known signal pattern generators (not shown). An IR compensation circuit 157 generates a signal which represents the IR drop in the motor armature 153. The speed command signal and the IR compensation signal are added together at a summing point 158 to generate a compensated speed command signal. A current limit circuit 159 generates a signal which limits the compensated speed command signal to a value such that armature current limits are not exceeded. Typically, this signal is utilized where safety regulations limit the maximum value of motor torque, for example, during the closing cycle of an elevator door operator motor. The current limit signal is subtracted from the compensated speed command signal at a summing point 161 to obtain a motor voltage command signal.

The motor voltage from the armature 153 is present on a line 162 and is subtracted from the motor voltage command signal at a summing point 163 to obtain a motor voltage error signal as an input to an integrator 164. The output from the integrator 164 is added to a switch control signal at a summing point 165 to generate an input to a comparator 166 which in turn generates the switch control signal. The integrator 164 and the comparator 166 are similar to the integrator 44 and the comparator 46 of FIGS. 4 and 8. The switch control signal is an input to the switch logic and switches 167 to alternately turn on switch pairs connected to opposite sides of the bridge 155 to apply voltage pulses of opposite polarity to the motor armature 153. The voltage pulses of opposite polarity will generate an average motor voltage which determines the speed of the motor 151. A choke 168 is connected in series between the motor armature 153 and the bridge 155 to increase the inductance and the time constant presented to the voltage pulses where the ripple current must be reduced. The ripple current may also be reduced by increasing the frequency of application of the voltage pulses.

In summary, the present invention supplies an average current to a load by applying alternating voltage pulses of opposite polarities derived from a unipolar voltage power source whereby the average current is a function of the magnitude of the voltage pulses and their durations. A command signal is subtracted from the control signal generated in response to the command signal to produce an error signal. The control signal is a duty cycled square wave having positive polarity and negative polarity portions which are superimposed on the subtracted direct current command signal to generate the error signal. The square wave error signal is integrated to produce a skewed sawtooth waveform which is added to the control signal to displace the positive-going and negative-going sawtooth portions. A comparator is responsive to the skewed sawtooth waveform to generate the squarewave control signal wherein the time intervals $t_1$ and $t_2$ of FIG. 2 are defined by the extreme points of the skewed sawtooth waveform. As utilized in a direct current shunt field motor control system, the actual motor speed is subtracted from the speed command signal to generate a speed error signal. The speed error signal is utilized to generate a field current command signal from which is subtracted the scaled field current to produce a field current error signal. The field current command signal is the input to and the scaled field current is the output from the present invention which controls the motor shunt field winding.

In view of the above, it may be seen that a number of modifications may be made to the system of the present invention as to individual components and their combinations without departing from its spirit and scope. Accordingly, it is to be appreciated that the detailed example set forth above is for illustrative purposes and is not to be read in a limiting sense.

I claim:

1. An apparatus for controlling current flow in a load, comprising:
   a power source for supplying unipolar voltage;
   switching means for selectively connecting said power source across said load for applying the voltage with a first polarity during a first time interval and for applying the voltage with a second polarity opposite said first polarity during a second time interval; and
   control means for defining said first and second time intervals including:
   means responsive to the current flowing in said load for generating an average voltage error signal;
   means for generating a switch control signal in response to said average voltage error signal and said switch control signal for controlling said switching means.

2. An apparatus as defined in claim 1 wherein said power source includes a source of alternating current power; voltage rectifying means; a transformer means connecting said source of alternating current power to the input of said rectifying means; and a current storage means connected to the output of said rectifying means for supplying unipolar voltage power.

3. An apparatus as defined in claim 1 wherein said switching means includes a first normally open switch connected between said load and said unipolar voltage power source and responsive to said control means for defining said first time interval for connecting said unipolar voltage power source to said load for applying the voltage with said first polarity during said first time interval.

4. An apparatus as defined in claim 3 wherein said switching means includes a second normally open switch connected between said load and said unipolar voltage power source and responsive to said control means for defining said second time interval for connecting said unipolar voltage power source to said load for applying the voltage with said second polarity during said second time interval.

5. An apparatus as defined in claim 1 wherein said means for generating an average voltage error signal includes a source of a current command signal; means for generating a scaled current signal representing the current flowing in said load; means responsive to said current command signal and said scaled current signal for generating a current error signal; and a first integrating means responsive to said current error signal for generating an average voltage error signal.

6. An apparatus as defined in claim 5 wherein said means for generating said switch control signal includes means for generating a square wave waveform of a first polarity during said first time interval and means for generating a square wave waveform of a second polarity opposite said first polarity during said second time interval for said switch control signal.

7. An apparatus as defined in claim 6 wherein said means for generating said switch control signal includes a second integrating means responsive to said average voltage error signal and said square wave switch control signal for generating a sawtooth waveform skewed by said average voltage error signal.

8. An apparatus as defined in claim 7 wherein said means for generating a square wave waveform is a comparator responsive to said sawtooth waveform and said switch control signal.

9. An apparatus for controlling current flow in a load, comprising:
   a power source for supplying unipolar voltage;
   switching means for selectively connecting said power source across said load for applying the voltage with a first polarity during a first time interval and for applying the voltage with a second polarity opposite said first polarity during a second time interval; said switching means including a first pair of normally open switches connected to the opposite ends of said load and responsive to a switch control signal of a first polarity for connecting said power source to said load for applying the voltage with said first polarity during said first time interval and said switching means including means responsive to said switch control signal for generating a first pulse train of alternating polarities during said first time interval and transformer means connected between said means for generating said first pulse train and said first pair of normally open switches; and
   control means for generating said switch control signal having a first polarity of a duration defining said first time interval and a second polarity opposite said first polarity of a duration defining said second time interval.

10. An apparatus as defined in claim 9 wherein said switching means includes rectifying means connected between said power source and said load for blocking current flow in said load.

11. An apparatus as defined in claim 10 wherein said rectifying means is a full-wave rectifying diode bridge.

12. An apparatus as defined in claim 9 wherein said switching means includes a second pair of normally open switches connected to the opposite ends of said load and responsive to said switch control signal of a second polarity for connecting said power source to said load for applying the voltage with said second polarity during said second time interval and wherein said switching means includes means responsive to said switch control signal for generating a second pulse train of alternating polarities during said second time interval and said transformer means is connected between said means for generating said second pulse train and said second pair of normally open switches.

13. An apparatus as defined in claim 12 wherein at least one of said normally open switches includes a transistor.

14. An apparatus as defined in claim 12 wherein at least one of said normally open switches includes a pair of transistors connected in a Darlington configuration.

15. An apparatus as defined in claim 10 wherein said first pair of normally open switches are connected in parallel with said rectifying means and connected to the opposite ends of said load and wherein said switching means includes a second pair of normally open switches connected in parallel with said rectifying means and connected to the opposite ends of said load, said second pair of switches being responsive to said switch control signal of a second polarity for connecting said power source to said load for applying the voltage with said second polarity during said second time interval.

16. An apparatus as defined in claim 15 wherein said switches are unidirectional and are of a polarity opposite the polarity of said rectifying means.

17. An apparatus as defined in claim 12 wherein said means for generating said first and second pulse trains includes clock means for defining the period of the pulses of said pulse trains.

18. An apparatus as deined in claim 17 wherein the period of the pulses of said first and second pulse trains is relatively short as compared with the durations of said first and second time intervals.

19. An apparatus as defined in claim 12 wherein said switching means includes time delay means for defining a third time interval during which all of said switches are normally open during the transition between said first and second time intervals and the transition between said second and first time intervals.

20. An apparatus as defined in claim 19 wherein said time delay means includes a capacitor.

21. An apparatus for controlling current flow in a load, comprising:
a power source for supplying unipolar voltage;
a full-wave rectifying diode bridge connected between said power source and said load for blocking current flow in said load;
a first pair of transistors each connected in parallel with a diode of said rectifying bridge and connected to opposite ends of said load for selectively connecting said power source across said load for applying the voltage with a first polarity during a first time interval;
a second pair of transistors each connected in parallel with a diode of said rectifying bridge and connected to opposite ends of said load for selectively connecting said power source across said load for applying the voltage with a second polarity during a second time interval;
control means for generating a switch control signal having a first polarity of a duration defining said first time interval and a second polarity opposite said first polarity of a duration defining said second time interval;
means responsive to said switch control signal for generating a first pulse train of alternating polarities during said first time interval and for generating a second pulse train of alternating polarities during said second time interval;
clock means for defining the period of the pulses of said first and second pulse trains wherein said period is relatively short as compared with the durations of said first and second time intervals;
transformer means connected between said means for generating said first and second pulse trains and said first and second pairs of transistors; and
time delay means for defining a third time interval during which all of said transistors are turned off during the transition between said first and second time intervals and the transition between said second and first time intervals.

22. A control for the field winding of a direct current electric motor, comprising:
a source of a field current command signal;
means for generating a signal representing the current flowing in said field winding;
control means responsive to said field current command signal and said field current signal for defining first and secont time intervals wherein said control means includes means responsive to said field current command signal and said signal representing field current for generating a field current error signal, first integrating means responsive to said field current error signal for generating an average field voltage error signal and means for generating a switch control signal having said first and second time intervals for controlling a switching means wherein said switch control signal is generated in response to said average field voltage error signal and said switch control signal;
a direct current power source; and
switching means responsive to said switch control signal for selectively connecting said power source across said field winding for applying the voltage with a first polarity during said first time interval and for applying the voltage with a second polarity opposite said first polarity during said second time interval.

23. A control as defined in claim 22 wherein said source of a field current command signal includes a source of a speed command signal for said electric motor; a source of a signal representing the actual speed of said electric motor; summing means responsive to said speed command signal and said actual speed signal for generating a speed error signal and means responsive to said speed error signal for generating said field current command signal.

24. A control as defined in claim 22 wherein said means for generating a signal representing field current includes a current shunt in series with said field winding.

25. A control as defined in claim 22 wherein said means for generating said switch control signal includes means for generating a square wave waveform of said first polarity during said first time interval and of said second polarity during said second time interval.

26. A control as defined in claim 25 wherein said means for generating said switch control signal includes second integrating means responsive to said average field voltage error signal and said square wave switch control signal for generating a sawtooth waveform skewed by said average field voltage error signal.

27. A control as defined in claim 26 wherein said means for generating a square wave waveform is a comparator responsive to said sawtooth waveform and said switch control signal.

28. A control as defined in claim 22 wherein said direct current power source includes a source of alternating current power; a current rectifying means; a transformer means connecting said source of alternating current power to the input of said rectifying means; and a current storage means connected to the output of said current rectifying means for supplying direct current power.

29. A control as defined in claim 22 wherein said switching means includes a first pair of normally open switches connected to the opposite ends of said field winding and responsive to said control means during said first time interval for connecting said direct current power source to said field winding for applying the voltage with said first polarity.

30. A control as defined in claim 29 wherein said switching means includes a second pair of normally open switches connected to the opposite ends of said field winding and responsive to said control means during said second time interval for connecting said direct current power source to said field winding for applying the voltage with said second polarity.

31. A control for the armature of a direct current electric motor, comprising:
a source of a motor voltage command signal including a source of a speed command signal for said electric motor, a source of a signal representing the IR drop in said motor armature, summing means responsive to said speed command signal and said IR drop signal for generating a compensated speed command signal and means responsive to said compensated speed command signal for generating said motor voltage command signal;
means for generating a signal representing the voltage applied to the motor armature;
control means responsive to said motor voltage command signal and said applied voltage signal for defining first and second time intervals;
a power source for supplying unipolar voltage; and
switching means for selectively connecting said power source across said motor armature for applying the voltage with a first polarity during said first time interval and for applying the voltage with a second polarity opposite said first polarity during said second time interval.

32. A control as defined in claim 31 wherein said source of a motor voltage command signal includes a source of a current limiting signal representing maximum locked rotor torque and wherein said means for generating said motor voltage command signal is responsive to said compensated speed command signal and said current limiting signal.

* * * * *

UNITED STATES PATENT OFFICE
CERTIFICATE OF CORRECTION

Patent No. 3,947,738　　　　　　　　　　　Dated　March 30, 1976

Inventor(s)　THEODORE A. OLIVER

It is certified that error appears in the above-identified patent and that said Letters Patent are hereby corrected as shown below:

| | |
|---|---|
| Column 2, line 24 | change "e" to -- be --. |
| Column 2, line 25 | change "pulse" to -- pulses --. |
| Column 3, line 35 | after "the" and before "field" insert -- motor --. |
| Column 4, line 11 | change "current" to -- error --. |
| Column 4, line 38 | after "dt" and before "$\Delta Q_1$" remove the "32". |
| Column 8, line 9 | change "wavefrom" to -- waveform --. |
| Column 9, line 18 | change "cut" to -- out --. |
| Column 9, line 60 | change "gate" to -- gates --. |
| Column 9, line 60 | change "85" to -- 86 --. |

Signed and Sealed this

Tenth Day of January 1978

[SEAL]

Attest:

RUTH C. MASON　　　　　　　　　LUTRELLE F. PARKER
*Attesting Officer*　　　　　　*Acting Commissioner of Patents and Trademarks*